Figure 1:
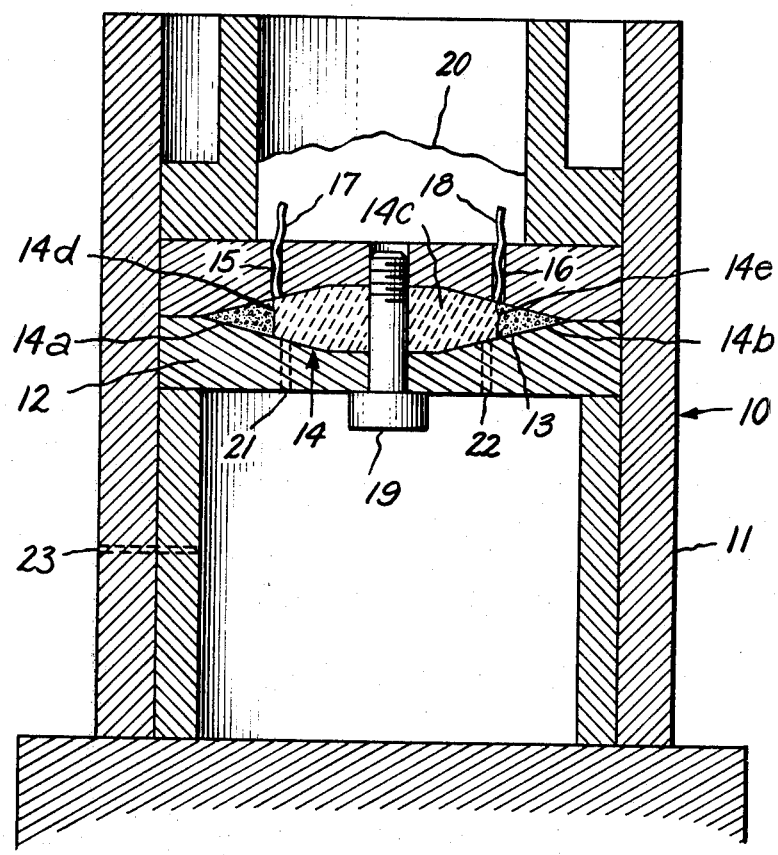

United States Patent [19]

Morelock

[11] 4,242,106

[45] Dec. 30, 1980

[54] COMPOSITE OF POLYCRYSTALLINE DIAMOND AND/OR CUBIC BORON NITRIDE BODY/SILICON CARBIDE SUBSTRATE

[75] Inventor: Charles R. Morelock, Ballston Spa, N.Y.

[73] Assignee: General Electric Company, Schenectady, N.Y.

[21] Appl. No.: 639

[22] Filed: Jan. 2, 1979

[51] Int. Cl.[3] .......................... B24D 3/04; B24D 3/10
[52] U.S. Cl. ........................ 51/307; 51/295; 264/60
[58] Field of Search ............... 51/307, 308, 309, 295, 51/296; 264/60

[56] References Cited

U.S. PATENT DOCUMENTS

| 3,816,085 | 6/1974 | Hall | 51/308 |
|---|---|---|---|
| 3,829,544 | 8/1974 | Hall | 51/307 |
| 3,852,078 | 12/1974 | Wakatsuki | 51/307 |
| 3,913,280 | 10/1975 | Hall | 51/307 |
| 4,104,441 | 8/1978 | Fedoseev et al. | 51/307 |
| 4,110,084 | 8/1978 | Lee et al. | 51/309 |
| 4,151,686 | 5/1979 | Lee et al. | 51/295 |
| 4,167,399 | 9/1979 | Lee et al. | 51/307 |
| 4,168,957 | 9/1979 | Lee et al. | 51/309 |
| 4,171,339 | 10/1979 | Lee et al. | 51/309 |

Primary Examiner—Donald J. Arnold
Attorney, Agent, or Firm—Jane M. Binkowski; James C. Davis, Jr.; Leo I. MaLossi

[57] ABSTRACT

A shaped confined structure composed of a mass of diamond and/or cubic boron nitride crystals coated with elemental non-diamond carbon in contact with a supporting silicon carbide substrate is infiltrated by fluid silicon producing a like-shaped composite of a polycrystalline body component integrally bonded to the supporting silicon carbide substrate.

8 Claims, 2 Drawing Figures

COMPOSITE OF POLYCRYSTALLINE DIAMOND AND/OR CUBIC BORON NITRIDE BODY/SILICON CARBIDE SUBSTRATE

This invention relates to the production of a self-supporting composite of predetermined shape and size comprised of a polycrystalline diamond and/or cubic boron nitride body integrally bonded to a supporting silicon carbide substrate. The diamond and/or cubic boron nitride crystals in the polycrystalline body component of the composite are bonded together by a bonding medium comprised of silicon carbide and elemental silicon.

The present process utilizes a partial vacuum, i.e. pressures substantially below the superpressures required by the diamond or cubic boron nitride stable region.

The present composite can be produced in a variety of configurations and a wide range of shapes and dimensions. It is useful as an abrasive, cutting tool, nozzle or other wear-resistant part.

Briefly stated, the present process for producing a composite comprises providing a crystal-containing carbonaceous mass composed of at least a substantially uniform mixture of diamond and/or cubic boron nitride crystals and a carbonaceous material wherein none of the surfaces of said crystals are exposed significantly and wherein at least a substantial amount of said crystals are enveloped and separated from each other by at least a coherent continuous coating of said carbonaceous material on said crystals, said carbonaceous material being selected from the group consisting of elemental non-diamond carbon, an organic material which completely decomposes at a temperature below 1400° C. to elemental non-diamond carbon and gaseous product of decomposition, and mixtures thereof, said organic material being present in an amount sufficient on decomposition to produce on the crystal surfaces it coats at least a coherent continuous coating of elemental non-diamond carbon and sufficient elemental non-diamond carbon to maintain said preform, providing a supporting silicon carbide substrate, providing a mold with a cavity of desired size and shape and means for introducing fluid silicon into said cavity and means for maintaining a partial vacuum in said cavity, filling said cavity with a preform comprised of said crystal-containing carbonaceous mass in contact with said silicon carbide substrate forming an interface therewith and confining said preform therein, said preform being the form desired of said composite, associating said filled cavity with a mass of silicon, providing the resulting associated structure with a partial vacuum wherein the residual gases have no significant deleterious effect on said associated structure, heating said associated structure in said partial vacuum to a temperature above 1400° C. at which said silicon is fluid and which does not have a significantly deleterious effect on said crystals and infiltrating said fluid silicon into said preform at least through said crystal-containing carbonaceous mass and at least into contact with the contacting surface of said substrate filling the pores through said interface so that it is at least substantially pore-free, said partial vacuum being at least sufficient to remove gas from said preform which blocks said infiltrating fluid silicon, said infiltrating silicon reacting with non-diamond elemental carbon forming silicon carbide, cooling the resulting composite in an atmosphere which has no significant deleterious effect on it, recovering the resulting composite of polycrystalline diamond and/or cubic boron nitride body integrally bonded to said silicon carbide substrate, said polycrystalline body being substantially pore-free wherein the crystals ranging from about 1% by volume up to about but less than 80% by volume of the total volume of said polycrystalline body are bonded together by a bonding medium comprised of silicon carbide and elemental silicon.

As used herein the term, elemental non-diamond carbon, includes all forms of elemental non-diamond carbon including graphite. In addition, the term, elemental non-diamond carbon, includes all physical forms of elemental non-diamond carbon such as, for example, a continuous solid, a porous solid, a powder, fiber, cloth and mixtures thereof.

In the present invention, the uninfiltrated green structure, i.e. preform, from which the composite is produced is formed into the shape and dimensions required of the composite since it undergoes no change or no significant change in shape or dimension during infiltration by the silicon. Also, the preform has the form required of the composite such as, for example, shape and thickness of the polycrystalline body and substrate components of the composite, and volume fraction of crystals. In addition, the morphology of the crystals in the polycrystalline body component of the composite is the same or is not significantly different from that of the crystal-containing carbonaceous mass of the preform.

Briefly stated, the present composite is an integral, self-supporting shaped body comprised of a diamond and/or cubic boron nitride crystal-containing body component and a supporting silicon carbide substrate component free of the diamond or cubic boron nitride crystals of said crystal-containing body component. The polycrystalline body component of the composite is the work or load-bearing component. Specifically, in the present composite, the polycrystalline body component is comprised of crystals selected from the group consisting of diamond, cubic boron nitride, and mixtures or combinations thereof, adherently bonded together by a bonding medium comprised of silicon carbide and elemental silicon, said crystals ranging in size from submicron up to about 2000 microns, the density or volume of said crystals ranging from about 1% by volume to about but less than 80% by volume of said polycrystalline body component, said bonding medium being present in an amount ranging up to about 99% by volume of said polycrystalline body component, said bonding medium being distributed at least substantially uniformly through said polycrystalline body component, the portion of said bonding medium in contact with the surfaces of said crystals consisting essentially of silicon carbide, said polycrystalline body component being at least substantially pore-free.

Figure 2:
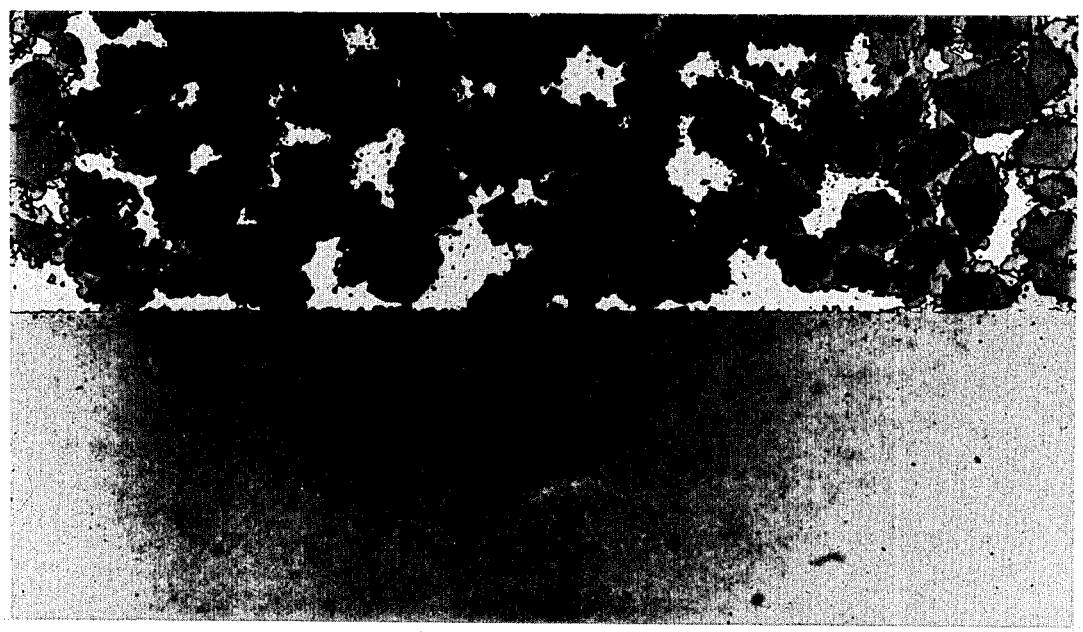

Those skilled in the art will gain a further and better understanding of the present invention from the detailed description set forth below, considered in conjunction with the figures accompanying and forming a part of the specification in which:

FIG. 1 is a sectional view through an apparatus showing an embodiment for carrying out the present process and FIG. 2 is a photomicrograph (magnified 150×) of a polished side of an integral composite prepared by the present process.

The diamond crystals used in the present process can be natural or synthetic. The diamond and/or cubic boron nitride crystals of the present invention can range in size in largest dimension from submicron up to about 2000 microns, and generally up to about 1000 microns. The particular size or sizes used depends largely on the particular packing or density of crystals desired and on the particular applications of the composite. For example, for most abrasive applications, crystals no greater than about 60 microns are preferred. Preferably, to maximize the packing of the crystals, they should be size-graded to contain a range of sizes, i.e. small, medium and large-sized crystals. Preferably, the size-graded crystals range from about 1 micron to about 60 microns, and preferably within this size range, about 60% by volume of the total mass of crystals are of the larger sized portion of the range, about 5% to about 10% by volume are of medium size with the balance constituting the small-sized crystals or particles.

Sizing of the crystals is facilitated by the jet-milling of larger crystals. Preferably, the crystals are chemically cleaned to remove any oxides or other impurities from the surface thereof before use in the present process. This may be accomplished by heating the crystals in hydrogen at about 900° C. for about one hour.

In the crystal-containing carbonaceous mass of the preform, the carbonaceous material is elemental non-diamond carbon, an organic material, or mixtures thereof. The organic material of the carbonaceous mass of the preform decomposes completely at an elevated temperature below 1400° C., and ordinarily decomposes completely at a temperature ranging from about 50° C. to about 1200° C., to produce elemental non-diamond carbon and gaseous product of decomposition. Specifically, it must decompose completely to produce elemental non-diamond carbon and gaseous product of decomposition before being infiltrated by fluid silicon.

In carrying out the present process, the crystal-containing carbonaceous mass of the preform is produced by admixing the mass of crystals in desired amount with the carbonaceous material in desired amount to produce a uniform or at least a substantially uniform mixture wherein none of the surfaces of the crystals are exposed, or wherein at least none of the surfaces of the crystals are exposed to any significant extent. Also, at least a substantial amount, i.e. at least about 90% by volume, of the total volume of crystals of the mixture are enveloped and separated from each other by at least a coherent coating of the carbonaceous material. The surface of the crystal that is not coated with carbonaceous material is not exposed, but it is in direct contact with the surface of another crystal.

A number of techniques can be used to form the present mixture of crystals and carbonaceous material and to shape the resulting mixture to the form and dimensions desired in the final product, i.e. composite. For example, the elemental non-diamond carbon can be deposited on the crystals by pyrolytic decomposition of a carbonaceous gas such as methane. Specifically, the crystals can be placed in a furnace provided with a non-oxidizing atmosphere such as hydrogen, nitrogen or an inert gas such as argon. A source of elemental non-diamond carbon such as natural gas or methane is fed into the furnace and the crystals are heated to a temperature sufficient to decompose the methane, ordinarily about 1200° C. whereby pyrolytic carbon is deposited on the crystals.

In forming the crystal-containing carbonaceous mass, when an organic material is used, it can be a solid or liquid at room temperature and should have no significant deleterious effect on the crystals. If such organic material is a solid, it should be sufficiently softened, or preferably dissolved in a suitable solvent to form a solution, before being admixed with the crystals in order to produce a uniform mixture. The organic material can be admixed with the crystals by a number of techniques including stirring the crystals with the organic material. If desired, the mixture can then be treated, for example subjected to a vacuum or heat, to remove any solvent present and further heated to decompose the organic material producing elemental non-diamond carbon in situ. Preferably, however, the wet, pliable or plastic mixture is shaped or molded on the substrate to the shape and dimensions desired of the final product, and the resulting shaped structure or preform treated, if necessary, to retain its shape and dimensions and impart sufficient mechanical strength for handling. For example, a curing or cross-linking agent can be added to the organic material and the resulting curable organic material admixed with the crystals, shaped, and cured sufficiently to retain its form. Shaping of the wet, pliable or plastic mixture can be carried out by a number of techniques, for example, in a temporary mold or in the mold which is to receive the fluid silicon.

Representative of the organic material useful in the present process are polymers of aromatic hydrocarbons such as polyphenylene and polymethylphenylene, derivatives of polynuclear aromatic hydrocarbons contained in coal tar such as dibenzanthracene and chrysene. Additional examples of useful organic materials are the epoxy resins such as the reaction product of epichlorohydrin and Bisphenol-A. Still additional examples of useful organic materials are phenolic resins obtained by the condensation of phenol or substituted phenols with aldehydes such as formaldehyde, acetaldehyde, and furfural. Specific examples are the condensation products of phenol-formaldehyde, resorcinol-formaldehyde, aniline-formaldehyde, and cresol-formaldehyde.

The present supporting polycrystalline silicon carbide substrate can vary in properties such as density, microstructure, and mechanical strength depending on the particular application of the composite. Specifically, the density of the supporting silicon carbide substrate can range from about 30% to about 100%. Density given herein of the polycrystalline silicon carbide body used as a substrate is the fractional density based on the theoretical density of the silicon carbide of 3.21 gm/cc.

For example, in the present composite, a silicon carbide substrate having a density of about 30% or higher makes the composite useful as a seal, whereas a substrate with a density of about 85% or higher makes it useful as a tool insert. Ordinarily, the higher the density of the silicon carbide body, the higher is its mechanical strength.

In the present substrate, the silicon carbide particles are bonded directly to each other, i.e. SiC-SiC. Since silicon carbide does not melt, such a silicon carbide bond is termed as being formed by solid state diffusion or welding.

In the present invention the polycrystalline silicon carbide substrate is a body comprised of silicon carbide, i.e., it contains silicon carbide in an amount of at least 90% by weight and usually at least 95% by weight, and generally from 96% to 99% or higher by weight, of the body. Any constituent or component of the present polycrystalline silicon carbide body other than silicon carbide should have no significant deteriorating effect on the mechanical properties of the resulting composite. Specifically, it should have no significant deteriorating effect on the properties of the silicon carbide and all other materials used in the present process in preparing the composite or on the properties of the composite itself.

The present silicon carbide substrate can be prepared by processes such as hot pressing or sintering. Specifically, it can be prepared by hot-pressing silicon carbide powder, which can range in size from submicron to about 2000 microns, at high temperatures and pressures, for example, 1850° C. to 2300° C. and 5000 psi to 10,000 psi or higher. The resulting hot pressed body can range in density from about 30% to about 80%. To achieve higher densities ranging up to about 100%, a densification additive such as boron or boron carbide must be included in the silicon carbide powder.

Specifically, the present polycrystalline silicon carbide bodies can be prepared by hot-pressing processes disclosed in U.S. Pat. Nos. 3,853,566; 3,960,577; 4,023,975 and 4,108,929; all assigned to the assignee hereof and all, by reference, are incorporated herein.

In one hot-pressing process, a dispersion of submicron powder of silicon carbide and an amount of boron or boron carbide equivalent to 0.5-3.0% by weight of boron, is hot-pressed at 1900°-2000° C. under 5000-10,000 psi to produce a boron-containing silicon carbide body. In another hot-pressing process, 0.5-3.0% by weight of elemental carbon or carbonaceous additive heat-decomposible to elemental carbon is included in the dispersion.

The present silicon carbide body also can be prepared by sintering processes disclosed in U.S. Pat. Nos. 4,004,934 and 4,041,117 all assigned to the assignee hereof, and all by reference, are incorporated herein.

Briefly stated, the sintered silicon carbide body can be prepared by providing a submicron particulate mixture of β-silicon carbide, boron additive and a carbonaceous additive which is free carbon or a carbonaceous organic material which is heat-decomposible to produce free carbon, and shaping the mixture into a green body. In an alternative method α-SiC, submicron in size but with an average particle size twice that of β-SiC, is admixed with the particulate mixture in an amount of 0.05% to 5% by weight based on the β-SiC. The green body is sintered at a temperature ranging from about 1900° C. to 2300° C. to the required density.

Specifically, the boron additive may be in the form of elemental boron, boron carbide or a boron compound which decomposes at a temperature below sintering temperature of yield boron or boron carbide and gaseous products of decomposition and is used in an amount equivalent to 0.3% to 3.0% by weight of elemental boron based on the amount of silicon carbide. During sintering, the boron additive enters into solid solution with the silicon carbide, and when amounts of the additive in excess of that equivalent to about 1% by weight of elemental boron are used, a boron carbide phase also precipitates.

The carbonaceous additive is used in an amount equivalent to about 0.1% by weight to about 1.0% by weight of free carbon based on the amount of silicon carbide. The additive can be free carbon or a solid or liquid carbonaceous organic material which completely decomposes at a temperature of 50° C. to 1000° C. to submicron size free carbon and gaseous products of decomposition. Examples of carbonaceous additives are polymers of aromatic hydrocarbons such as polyphenylene or polymethylphenylene which are soluble in aromatic hydrocarbons.

The sintered body is comprised of silicon carbide and based on the amount of silicon carbide, from about 0.3% to about 3% by weight of boron and up to about 1% by weight of free carbon. The boron is in solid solution with the silicon carbide or, alternatively, in solid solution with the silicon carbide and also present as a boron carbide phase. The free carbon, when it is detectable, is in the form of submicron particles dispersed throughout the sintered body.

The thickness of the silicon carbide substrate in the present composite can vary depending on the final application of the resulting composite, but it should be at least sufficiently thick to provide adequate support for the polycrystalline diamond and/or dubic boron nitride body component integrally bonded thereto. For most applications, to provide and insure satisfactory support for the polycrystalline diamond and/or cubic boron nitride body, the silicon carbide substrate is preferably at least about twice the thickness of the polycrystalline body component.

A mold with a cavity of desired shape and size is used. The mold should be made of material which has no significantly deleterious effect on the present process or composite. Preferably, it is made of graphite and preferably it is machinable to the size and shape desired of the final product. Alternatively, the cavity of the mold can be fitted, lined or pressed with a material which is substantially inert with respect to the present process and product, such as hexagonal boron nitride powder, which can be used to produce the final composite of desired shape and size. A parting agent, such as a film of hexagonal boron nitride powder, preferably is sprayed on a material such as graphite to enable a clean separation of the final product from the mold.

The mold has means for introducing fluid silicon into the cavity. For example, such means can be holes passing through the mold wall and open to the cavity and to the outside of the mold. Preferably, these infiltration holes are located at the top or in the upper portion of the mold so that the flow of fluid silicon into the cavity is promoted by gravity. These holes can vary in number and diameter depending largely on the extent desired for introducing fluid silicon into contact with the confined preform.

The number of infiltration holes used is not critical but with an increasing number of infiltration holes, the faster the silicon is introduced into contact with the confined preform within the mold thereby reducing total infiltration time. On the other hand, the infiltration holes should not be so great in number or diameter as to allow the fluid silicon to be introduced into the cavity to the extent that silicon surrounds the confined preform or the crystal-containing carbonaceous mass of the preform, since that would entrap gas within the crystal-containing mass and prevent infiltration of the fluid silicon therethrough. Infiltration of the fluid silicon should proceed through the crystal-containing carbonaceous mass of the preform towards a single external surface or external point of the crystal-containing carbonaceous mass or of the interface to allow removal of pockets of gas thereby allowing silicon infiltration throughout the crystal-containing carbonaceous mass and interface. Infiltration of the fluid silicon through the confined crystal-containing carbonaceous mass and interface of the preform is by capillary action.

Generally, the infiltration holes in the mold range from about 10 mils to 125 mils in diameter and holes of larger size provide no significant advantage. Due to the surface tension of elemental silicon which prevents it from passing through such small holes, these holes are provided with a wick, preferably of elemental non-diamond carbon, which passes, i.e. wicks, the fluid silicon through the holes and into the cavity. The smaller the holes, the less likely excess elemental Si/SiC material will be left on the finished product. Ordinarily, any excess Si/SiC material on the surface of the finished product is in the form of a nib or glob which can be ground, machined or polished off in a conventional manner.

The preform, i.e. the crystal-containing carbonaceous mass in contact with the silicon carbide substrate forming an interface therewith, in the form required of the composite, should fill the cavity within the mold in order to produce the final product or composite of desired shape and dimensions since there is no change or no significant change between the volume occupied by the preform and the final infiltrated product, i.e. composite. The crystal content of the shaped crystal-containing carbonaceous mass of the preform can be in the form of a monolayer or in excess of a monolayer of crystals. The mold, i.e. filled cavity, then is closed. Vents in the mold preferably located in the bottom portion of the mold, are used to evacuate the cavity and maintain the desired partial vacuum therein. The filled mold is associated with a mass of elemental silicon, which preferably is located above the mold.

FIG. 1 shows a cross-section of an associated structure or apparatus 10 illustrating a preferred embodiment for carrying out the present process. Supporting frame 11 is non-metal, preferably is made of graphite and can be machined to the configuration desired. Mold 12 and cavity 13 are provided with a non-metallic connector 19, preferably of graphite, which passes through cavity 13 and which has a threaded end to keep mold 12 closed during silicon infiltration. The preform 14 fills cavity 13 surrounding connector 19. Holes 15 and 16 are provided with wicks 17 and 18 which are in contact with preform 14 and which pass silicon 20 in fluid form into cavity 13 to infiltrate at least through crystal-containing carbonaceous mass or mixture, 14a and 14b, and at least into contact with the contacting surface of silicon carbide substrate 14c and at least filling interface 14d and 14e so that interfaces 14d and 14e are pore-free, or at least substantially pore-free.

Vent holes 21 and 22 allow for the escape of gas from cavity 13 which exit out of vant 23. Vent holes 21, 22 and 23 are used to maintain the required partial vacuum in cavity 13. A silicon carbide substrate with a density of about 85% or higher makes the substrate hard and strong which makes the composite useful as a grinding wheel. Specifically, connector 19 leaves a hole of like diameter passing through the finished composite which has the form of a wheel with a sharp edge, i.e. the present polycrystalline body component, making the composite useful as a grinding wheel.

The associated structure or apparatus 10 is placed within a furnace and provided with a partial vacuum wherein the residual gases have no significantly deleterious effect on said associated structure. Specifically, the furnace chamber is maintained under the partial vacuum which also maintains the associated structure, i.e. the confined preform within the cavity of the mold and the associated mass of elemental silicon, under partial vacuum. The partial vacuum should be at least sufficient to remove pockets of gas which may be trapped within the confined preform and which would block the infiltrating fluid silicon thereby leaving pores in the finished product. Generally, such a partial vacuum ranges from about 0.01 torr to about 2 torr, and usually from about 0.01 torr to about 1 torr to insure removal of entrapped gas in the confined preform.

Ordinarily and as a practical matter, the furnace used is a carbon furnace, i.e. a furnace fabricated from elemental non-diamond carbon. Such a furnace acts as an oxygen getter for the atmosphere within the furnace reacting with oxygen to produce $CO$ or $CO_2$ and thereby provides a non-oxidizing atmosphere, i.e. the residual gases have no significantly deleterious effect on the crystals or infiltrating silicon. The present infiltration cannot be carried out in air because diamond graphitizes rapidly in air above 800° C. and the liquid silicon would oxidize to form solid silica before any significant infusion by silicon of the confined mixture occurred. In such instance where a carbon furnace is not used, it is preferable to have an oxygen getter present in the furnace chamber, such as elemental non-diamond carbon, in order to insure the maintenance of a non-oxidizing atmosphere. Alternatively, such non-oxidizing atmosphere, or atmosphere which has no significant deleterious effect on the associated structure within the furnace, can be provided by a sufficiently high partial vacuum, i.e. about $10^{-2}$ torr to 2 torr.

The associated mass of silicon and confined preform are heated to infiltration temperature which is above 1400° C. When the crystal-containing carbonaceous mass of the preform contains organic material, such organic material decomposes completely at a temperature below 1400° C. producing elemental non-diamond carbon and gaseous product of decomposition. Therefore, the crystal-containing carbonaceous mass of the preform that is infiltrated by the silicon is comprised of diamond and/or cubic boron nitride crystals and elemental non-diamond carbon.

The elemental non-diamond carbon in the shaped crystal-containing mass of the preform that is infiltrated by silicon should have sufficient interconnecting pores or cell structure which allows the silicon to infiltrate therethrough. Specifically, such elemental non-diamond carbon in the crystal-containing mass may range in interconnecting porosity but its density should not exceed 0.96 g/cc, because if it is more dense than 0.96 g/cc, fluid elemental silicon may not penetrate it, or if it should penetrate or infiltrate such a dense elemental non-diamond carbond, the resulting polycrystalline body will puff up and be distorted. The maximum interconnecting porosity of the elemental non-diamond carbon of the shaped crystal-containing mass is that which maintains its shape and dimensions with none of the surfaces of the crystals being exposed significantly, and generally, such maximum porosity is about 90% by volume of the total volume of elemental non-diamond carbon in the crystal-containing mass which is infiltrated by silicon.

The pores in the elemental non-diamond carbon in the shaped crystal-containing mass of the preform that is infiltrated by silicon should be distributed uniformly or at least significantly uniformly throughout the mass or mixture to prevent formation of excessively large pockets of elemental silicon which may lower the mechanical properties of the resulting polycrystalline body component of the composite thereby limiting its applications. The pores can range in size, and generally can range up to about 2000 microns, but preferably are not larger than the size of the crystals used. For best results, the pores are submicron in size.

The porosity of the shaped mixture of crystals and elemental non-diamond carbon of the preform is determinable by a number of conventional techniques.

If desired, the preform can have a plurality of the present crystal-containing carbonaceous mass, each forming an interface with the other and differing from each other significantly in diamond and/or cubic boron nitride crystal content producing a composite with a graded structure with respect to its crystal content. Specifically, the resulting integrally bonded composite has a plurality of polycrystalline body components integrally bonded to each other and differing from each other significantly in crystal content, and in such a composite the silicon carbide substrate component would have at least about twice the thickness of the total thickness of the polycrystalline diamond and/or cubic boron nitride body components. A composite with such a graded crystal structure, preferably decreasing in crystal content as the supporting silicon carbide substrate is approached, is particularly useful for a number of abrasive applications.

The present infiltration is carried out at a temperature above 1400° C. at which silicon becomes fluid and which has no significant deleterious effect on the crystals. For cubic boron nitride crystals infiltration temperatures significantly higher than about 1450° C. are not useful since they are likely to cause conversion to hexagonal boron nitride. On the other hand, for diamond crystals, temperatures higher than 1550° C. provide no significant advantage. By a temperature at which silicon becomes fluid it is meant herein a temperature at which the silicon is readily flowable. The fluid silicon is highly mobile and highly reactive with elemental non-diamond carbon, i.e. it has an affinity for elemental non-diamond carbon, wetting it and reacting with it to form silicon carbide. Specifically, when silicon is at its melting temperature, which has been given in the art to range from about 1412° C. to about 1430° C., it has a high viscosity, but as its temperature is raised, it becomes less viscous and at a temperature about ten degrees higher than its melting point, it becomes fluid. The temperature at which the silicon is fluid is the temperature at which it will infuse or infiltrate through the capillary-size passages, interstices or voids of the shaped mixture or mass of crystals and elemental non-diamond carbon of the preform. With increase in temperature, the flowability of the fluid silicon increases resulting in a faster rate of reaction.

In the present process, sufficient silicon is infiltrated throughout the shaped crystal-containing mass of the preform, i.e. shaped mixture of crystals and elemental non-diamond carbon, infusing or infiltrating through the voids or pores of the mixture by capillary action to react with all of the elemental non-diamond carbon present in the shaped mixture forming silicon carbide, and also to fill any pores or voids which may remain after formation of the silicon carbide producing an integral, strongly bonded and at least substantially pore-free polycrystalline body component. Specifically, silicon carbide occupies more volume than elemental non-diamond carbon thereby reducing porosity, and any pores remaining after formation of silicon carbide are filled during infiltration with elemental silicon. Also, during infiltration the silicon reacts with the elemental non-diamond carbon coating on the surfaces of the crystals forming a protective adherent coating of silicon carbide on the surfaces and causing no loss or no significant loss of crystal and no change or no significant change in the shape and dimensions of the crystals. Also, in the present process sufficient silicon is infiltrated through the interface of the preform filling any pores or voids therein wetting the contacting surface of the silicon carbide substrate and substrate surface exposed to the interface resulting in the production of an integral bond in situ that is pore-free or at least substantially pore-free comprised of elemental silicon and silicon carbide. The resulting product is an integral well-bonded composite.

The resulting infiltrated preform or composite is cooled in an atmosphere which has no significant deleterious effect on it, preferably it is furnace cooled in the partial vacuum to about room temperature, and the resulting composite is recovered.

The period of time required for infiltration by the silicon is determinable empirically and depends largely on the size of the crystal-containing carbonaceous mass of the preform, and frequently, infiltration by the fluid silicon is completed within about 15 or 20 minutes.

A number of techniques can be used to determine the extent to which silicon has infiltrated. For example, the mold can be cooled to room temperature, opened and the extent of silicon infiltration observed.

In another technique the composition of polycrystalline body component of the final composite can be determined from the weight, porosity, amount of elemental non-diamond carbon and amount of crystals of the shaped mixture of the preform comprised of the crystals and elemental non-diamond carbon. Specifically, the content of silicon carbide in the polycrystalline body component of the composite can be calculated from the amount of elemental non-diamond carbon in the shaped mixture of the preform. The porosity remaining after silicon carbide reaction is completed will be the volume occupied by elemental silicon. The weight of the final polycrystalline body component of the composite is the total, or approximately the total, of the weights of its crystal content, its silicon carbide content and its elemental silicon content. Also, knowing the weight of the preform before it is infiltrated, any gain in weight by the preform during infiltration can be used to determine the extent of infiltration.

In the present composite, the polycrystalline body component is comprised of crystals selected from the group consisting of diamond, cubic boron nitride and combinations thereof adherently bonded together by a bonding medium comprised of silicon carbide and elemental silicon, said crystals ranging in size from submicron to about 2000 microns, the density of said crystals ranging from about 1% by volume up to about but less than 80% by volume of said body component, frequently up to about 75% by volume of said body component, said bonding medium being present in an amount ranging up to about 99% by volume of said body component, said bonding medium being distributed at least substantially uniformly throughout said polycrystalline body component, the portion or surface of said bonding medium in direct contact with the surfaces of the bonded crystals being silicon carbide. The present polycrystalline body component is pore-free or at least substantially pore-free.

The amount of silicon carbide in the present polycrystalline body component of the composite depends on the amount of elemental non-diamond carbon in the shaped mixture before it is infiltrated, and this is illustrated by the following equation:

$$Si + C \rightarrow SiC.$$

On the other hand, the amount of elemental silicon in the polycrystalline body component depends on the porosity or pores remaining after the total amount of elemental non-diamond carbon is reacted to form silicon carbide. However, the present polycrystalline body component always contains silicon carbide in an amount of at least about 1% by volume of the polycrystalline body component and elemental silicon in an amount of at least about 1% by volume of the polycrystalline body component.

The present polycrystalline body component of the composite usually is free of elemental non-diamond carbon phase. However, it may contain non-diamond elemental carbon phase in an amount ranging up to about 5% by volume of the polycrystalline body component provided such non-diamond elemental carbon phase is sufficiently distributed throughout the polycrystalline body component so as not to have any significant deleterious effect on its mechanical properties. The presence of the elemental non-diamond carbon phase is detectable by standard metallographic techniques such as, for example, by optically examining a polished cross-section of the polycrystalline body component or by transmission electron microscopy on a thin section of the polycrystalline body component.

The present polycrystalline body component of the composite is void or pore-free or at least substantially pore-free, i.e. it may contain voids or pores in an amount less than about 5% by volume of the polycrystalline body component depending on its particular application providing such voids or pores are small, preferably less than 1 micron, and sufficiently uniformly distributed throughout the polycrystalline body component so that they have no significantly deteriorating effect on its mechanical properties. The void or pore content of the present polycrystalline body component is determinable by standard metallographic techniques such as, for example, optically examining a polished cross-section of the body.

In the present composite, the integral bond between the polycrystalline body component and the silicon carbide substrate component is part of the structure of the composite and is not seen as an independent distinct phase. Specifically, it is the transition or border area between the polycrystalline body component and the silicon carbide substrate and appears as that portion of the bonding medium of the polycrystalline body component in contact with the silicon carbide substrate. Such integral bond has the same or substantially the same composition and properties as the bonding medium of the polycrystalline body component of the composite. Specifically, it is comprised of elemental silicon and silicon carbide and it is free or substantially free of elemental non-diamond carbon phase, i.e. it is free of any elemental non-diamond carbon phase which may have any significant deleterious effect on its bonding properties. Also, it is pore-free or at least substantially pore-free, i.e. it may contain voids or pores which are small, preferably less than 1 micron, and sufficient uniformly distributed in an amount which has no significant deleterious effect on its bonding properties. The void or pore content as well as the content of elemental non-diamond carbon phase in the area of the composite where the integral bond is present is determinable by standard metallographic techniques such as, for example, optically examining a cross section of the composite under high magnification.

One particular advantage of this invention is that the present polycrystalline body component and composite can be produced directly in a wide range of sizes and shapes which heretofore could not be manufactured or required expensive and tedious machining because of the very nature of the material. For example, the present polycrystalline body component and composite can be as long as several inches, or as long as desired, and be of very complex geometry, and specifically, it can be produced in the form of a tube or a hollow cylinder, a ring, a sphere or a bar having a sharp point at one end. Also, since the present polycrystalline body component is produced in a predetermined configuration of predetermined dimensions, it requires little or no machining.

The present composite is useful as a tool insert which, for example, can be held by a tool shank adapted to be held in a machine tool whereby the exposed surface of the polycrystalline body component can be used for direct machining.

Since the use of diamond or cubic boron nitride particles is limited by scarcity and high cost, the present invention is particularly useful in applications requiring large surface areas of hard materials. Specifically, it allows the use of a small quantity of diamond or cubic boron nitride particles, crystals or dust to be formed into a hard layer or coating integrally bonded to a substrate producing a structurally useful hardware piece for applications where surface wear resistance is necessary. Also, the present invention allows the use of a monolayer of crystals of diamond, cubic boron nitride or mixtures thereof to be formed into a hard layer or coating integrally bonded to a substrate, and specifically, the resulting composite would have a polycrystalline body component as thin as the monolayer of diamond and/or cubic boron nitride crystals or dust integrally bonded to the supporting silicon carbide substrate. The term, crystals, herein includes diamond and/or cubic boron nitride dust.

The present composite is particularly useful because of its thermal stability and inertness. Specifically, it is thermally stable in air up to the melting point of silicon, i.e. above 1400° C. Also, corrosive chemicals, oils and greases and similar materials have no significant deleterious effect on the present composite, which makes it particularly useful in applications which require exposure to such materials. In addition, diamond has an affinity for greases which makes the present composite useful as a seal or bearing in motors.

The invention is further illustrated by the following example where, unless otherwise stated, the procedure was as follows:

Commercially pure silicon was used for infiltration.

The "Epon 828" used is a resin formed from the reaction of epichlorohydrin and Bisphenol A, which is a liquid at room temperature and which has an epoxide equivalent of 185–192. Epon 828 decomposes completely below 1300° C.

The curing agent used was diethylenetriamine, a liquid commonly called DTA which cures Epon 828 at room temperature thereby solidifying it.

In this example, the diamond crystals were coated with a very thin coating of pyrolitic carbon deposited by the decomposition of natural gas. Specifically, for this coating procedure, the diamond crystals were spread out in a graphite crucible and placed in a graphite furnace which was a vacuum bell jar. The furnace was evacuated down to 0.003 torr and heated to 1200° C. Methane from a natural gas line was admitted into the furnace maintained at a pressure of 50 torr for about five minutes. The furnace was then shut off and the crystals were furnace-cooled to room temperature in the 0.003 torr vacuum. The crystals were then re-spread in the crucible, returned to the furnace and the coating procedure was repeated to insure a complete coating of the crystals.

Examination of the coated diamond crystals showed them to have a continuous, coherent, very adherent coating of elemental non-diamond carbon, i.e. over 99% by volume of the diamond crystals were separated from each other by the carbon coating, and none of the surfaces of the crystals were exposed. Since the deposited coating of elemental non-diamond carbon on the crystals were very thin, i.e. it ranged in thickness from about 500 Angstroms to about 1000 Angstroms, it did not add to the weight of the crystals significantly, and therefore, the given weight of the starting diamond crystals is that of these carbon-coated crystals.

Since the amount of diamond crystals remained the same or did not change significantly from that in the preform, the volume fraction of crystals in the polycrystalline diamond body component of the resulting composite was calculated and also was based on the appearance of the polycrystalline body component of the composite.

The volume fraction of silicon carbide in the polycrystalline diamond body component of the composite was calculated based only on the amount of elemental non-diamond carbon added to form the crystal-containing shaped mixture of the preform, since the amount of elemental non-diamond carbon deposited as coating on the diamond crystals and that produced from "Epon 828" resin was not significant.

The volume fraction of elemental silicon in the polycrystalline diamond body component of the composite was calculated and also was based on the pore-free or substantially pore-free appearance of the polycrystalline diamond body component of the composite.

The silicon carbide substrate was a polycrystalline silicon carbide body sold under the trademark NC203 produced by hot-pressing particulate silicon carbide and densification additive and contained silicon carbide in excess of 90% by weight.

EXAMPLE

An equilateral triangular piece of the silicon carbide substrate, 0.10 inch thick and 0.625 inch in length on each side, was used. The substrate had flat triangular surfaces.

At room temperature, DTA curing agent was mixed with 0.01 gram of Epon 828 resin in an amount of 10% by weight of the Epon 828, and this mixture was then admixed with 0.17 gram of 210/230 mesh (equivalent to 74/62 microns) carbon-coated diamond crystals and 0.02 gram crushed carbon cloth to form a uniform mixture.

The resulting crystal-containing mixture was spread on one of the flat triangular surfaces of the silicon carbide substrate forming a continuous coating thereon. The resulting preform was placed in a 100° C. oven for 1 hour to cure, i.e. harden, the Epon 828. The resulting cured crystal-containing layer of the preform had a thickness of ~0.025 inch.

The preform, which was held together by the cured resin, was fitted onto a graphite mold, wherein all of the surfaces had been sprayed with hexagonal boron nitride.

The associated structure or apparatus for carrying out the silicon infiltration was similar to that shown in FIG. 1. Specifically, a solid graphite cylinder was used with a cavity drilled into its upper end portion for holding silicon and a cavity drilled in its lower end portion for use as a mold cavity. The mold cavity was drilled to approximately correspond to the shape and dimensions of the preform. Two infiltration holes, about 50 mils in diameter, were drilled substantially perpendicularly between the two cavities connecting them. The preform was placed within the mold cavity with the exposed flat triangular surface of the substrate portion of the preform facing the upper cavity. Any free space remaining in the mold cavity was filled with hexagonal boron nitride powder. A wick of elemental non-diamond carbon fiber, about 500 mils long and about 40 mils in diameter, was positioned within each infiltration hole to extend into the upper cavity, but to be just in contact with the surface of the substrate portion of the preform in the mold cavity. The mold cavity was then closed with a graphite plate forming a mold which was not air tight and therefore could be ventilated without a vent hole. The graphite plate was held in place by carbon filament or graphite bars. 0.4 gram of granular elemental silicon was placed in the upper cavity.

The resulting associated structure was placed in a graphite vacuum furnace which was evacuated to about 0.1 torr and maintained at about 0.1 torr during silicon infiltration and subsequent furnace-cooling to room temperature. The residual gases in the furnace were non-oxidizing.

The furnace was heated to about 1500° C. and maintained at such temperature for 10 minutes. The power was then cut off and the structure was furnace-cooled to room temperature.

The amount of infiltrating silicon was sufficient to completely infiltrate through the resulting mixture of crystals and elemental non-diamond carbon, and its interface with the substrate, and completion of the silicon infiltration in the given time was based on experience and results with similar runs.

The resulting composite was recovered from the mold without sticking. The remains of the infiltration wicks were machined off the substrate component of the composite. The resulting composite was an integral equilateral triangular piece which had a form, i.e. shape and dimensions, not significantly different from that of the preform. Specifically, the total thickness of the composite was ~0.125 inch, and the thickness of the polycrystalline diamond coating, i.e. polycrystalline diamond body component of the composite was ~0.025 inch.

Examination of the polished surfaces of the composite was made optically under a microscope.

The face of the polycrystalline diamond body component of the composite was polished on a diamond wheel and appeared to be completely infiltrated with bonding medium which appeared to be uniformly distributed, and the diamond particles appeared to be well bonded. Examination of the polished face showed no strings of holes formed from diamond fragment pullout illustrating the strong bonding therein. There appeared to be no significant loss of diamond crystals and no change or no significant change in the shape and dimensions of the diamond crystals. In the polished polycrystalline diamond face of the composite, elemental silicon was seen as a shiny grey phase, submicron in size and substantially uniformly distributed, silicon carbide was seen as a dull dark grey phase, and the diamond appeared as smooth individual crystals separated by the bonding medium.

A side surface of the composite was polished on a diamond polishing scaife and this surface is shown in FIG. 2. The remaining two side surfaces were polished on a diamond wheel. No delamination of the silicon carbide substrate occurred indicating the very strong bonding of the composite.

In FIG. 2 the upper layer with the diamond crystals distributed therein is the polycrystalline diamond body component and the lower layer is the supporting silicon carbide substrate. FIG. 2 illustrates that the integral bond formed between the polycrystalline body component and the supporting silicon carbide component is part of and within the structure of the composite and does not appear as a separate distinct phase.

Specifically, in FIG. 2, the integral bond appears as that portion of the bonding medium of the polycrystalline diamond body component in contact with the supporting silicon carbide substrate component. The area along the two components where the integral bond is present appears free of any elemental non-diamond carbon phase as well as free of pores which would significantly effect the adherence of the polycrystalline body component to the supporting silicon carbide substrate.

Examination of the polished side surfaces of the polycrystalline body component showed them to be completely infiltrated, and the bonding medium appeared to be uniformly distributed. There appeared to be no loss or no significant loss of diamond crystals and no change or no significant change in their shape and dimensions. Elemental silicon was seen as a shiny phase, submicron in size and substantially uniformly distributed. In addition, all of the polished surfaces of the polycrystalline diamond body component appeared to be free of elemental carbon phase in some areas and at least substantially free of elemental non-diamond carbon phase in other areas.

Also, all of the polished surfaces of the composite appeared to be free of pores in some areas and at least substantially free of pores in other areas. It is estimated from optical examination that the infiltrated portion of the composite had a porosity of approximately 1% by volume of the total volume of such infiltrated portion.

A close look at FIG. 2, shows the diamond crystals at least enveloped with a dark grey phase, and this dark grey phase which is silicon carbide, is also shown as distributed through the diamond bonding medium. The lighter colored phase distributed through the bonding medium of the polycrystalline diamond phase is elemental silicon.

The polycrystalline diamond body component of the composite was comprised of about 60% by volume of diamond crystals, about 20% by volume of silicon carbide, about 18% by volume of elemental silicon, about 1% by volume of elemental non-diamond carbon phase largely of submicron size and had approximately about 1% by volume of pores largely of submicron size.

The composite prepared in this Example is useful as a wear-resistant surface such as a cutting or bearing surface.

The following copending applications assigned to the assignee hereof are incorporated herein by reference:

U.S. Ser. No. 954,289 filed Oct. 24, 1978, in the names of St. Pierre et al. and entitled "POLYCRYSTALLINE DIAMOND AND/OR CUBIC BORON NITRIDE BODY" discloses that a shaped confined mass of diamond and/or cubic boron nitride crystals coated with elemental non-diamond carbon, under a partial vacuum, is infiltrated by fluid silicon producing a like-shaped product wherein the crystals are bonded together by a medium comprised of silicon carbide and elemental silicon.

U.S. Ser. No. 974,496 filed Dec. 29, 1978 in the name of Charles Robert Morelock and entitled "INTEGRAL COMPOSITE OF POLYCRYSTALLINE DIAMOND AND/OR CUBIC BORON NITRIDE BODY PHASE AND SUBSTRATE PHASE" discloses that a shaped confined structure composed of a mass of diamond and/or cubic boron nitride crystals coated with elemental non-diamond carbon in contact with a carbonaceous substrate is infiltrated by fluid silicon producing a like-shaped composite of a polycrystalline body phase integrally bonded to a substrate supporting phase which can be comprised of silicon carbide and elemental silicon.

What is claimed is:

1. A process for producing an integrally bonded composite of a polycrystalline diamond and/or cubic boron nitride body component and a supporting silicon carbide substrate component, which consists essentially of providing a crystal containing carbonaceous mass composed of at least a substantially uniform mixture of crystals selected from the group consisting of diamond, cubic boron nitride, and combinations thereof, and a carbonaceous material wherein none of the surfaces of said crystals are exposed significantly and wherein at least a substantial amount of said crystals are enveloped and separated from each other by at least a coherent continuous coating of said carbonaceous material on said crystals, said carbonaceous material being selected from the group consisting of elemental non-diamond carbon, an organic material, and mixtures thereof, providing a supporting silicon carbide substrate consisting essentially of a hot-pressed or sintered polycrystalline silicon carbide body wherein the silicon carbide grains are bonded directly to each other and which ranges in density from about 30% to about 100% of the theoretical density of silicon carbide, providing a mold with a cavity of desired size and shape and means for introducing fluid silicon into said cavity and means for maintaining a partial vacuum in said cavity, filling said cavity with a preform consisting essentially of said crystal-containing carbonaceous mass in contact with said supporting silicon carbide substrate forming an interface therewith and confining said preform therein, said preform being the form desired of said composite, said organic material decomposing at a temperature below 1400° C. to elemental non-diamond carbon and gaseous product of decomposition, said organic material being present in an amount sufficient on decomposition to produce on the crystal surfaces it coats at least a coherent continuous coating of elemental non-diamond carbon, and at least sufficient elemental non-diamond carbon to maintain said preform, associating said confined preform in said mold cavity with a mass of solid silicon via said means for introducing fluid silicon into said mold cavity, providing the resulting associated structure with a partial vacuum wherein the residual gases have no significant deleterious effect on said associated structure, heating said associated structure in said partial vacuum to a temperature above 1400° C. at which said silicon is fluid and which does not have a significantly deleterious effect on said crystals, introducing said fluid silicon to said confined preform via said means for introducing fluid silicon into said cavity, and infiltrating said fluid silicon into said preform at least through said crystal-containing carbonaceous mass and at least into contact with the contacting surface of said substrate filling the pores through said interface so that it is at least substantially pore-free, said partial vacuum being at least sufficient to remove gas from said preform which blocks said infiltrating fluid silicon, said infiltrating silicon reacting with non-diamond elemental carbon forming silicon carbide, cooling the resulting composite in an atmosphere which has no significant deleterious effect on it, recovering the resulting integrally bonded composite of polycrystalline diamond and/or cubic boron nitride body component and supporting substrate component, said polycrystalline body component being substantially pore-free wherein the diamond and/or cubic boron nitride crystals ranging from about 1% by volume up to about but less than 80% by volume of the total volume of said polycrystalline body are bonded together by a bonding medium comprised of silicon carbide and elemental silicon.

2. The process of claim 1 wherein said crystals are diamond.

3. The process of claim 1 wherein said crystals are cubic boron nitride.

4. A self-supporting composite consisting essentially of a polycrystalline diamond and/or cubic boron nitride body component integrally bonded to a supporting silicon carbide substrate, said polycrystalline body component being comprised of crystals selected from the group consisting of diamond, cubic boron nitride and mixtures thereof adherently bonded together by a bonding medium consisting essentially of silicon carbide and elemental silicon wherein the volume of said silicon carbide and said silicon each is at least about 1% by volume of said polycrystalline body component, said crystals ranging in size from submicron up to about 2000 microns, the volume of said crystals ranging from about 1% by volume to about but less than 80% by volume of said polycrystalline body component, said bonding medium being present in an amount ranging up to about 99% by volume of said polycrystalline body component, said bonding medium being distributed at least substantially uniformly throughout said polycrystalline body component, the portion of said bonding medium in contact with the surface of said crystals being silicon carbide, said polycrystalline body component being at least substantially pore-free, said silicon carbide substrate consisting essentially of a hot-pressed or sintered polycrystalline silicon carbide body wherein the silicon carbide grains are bonded directly to each other and which ranges in density from about 30% to about 100% of the theoretical density of silicon carbide, said bonding medium extending into contact with said silicon carbide substrate.

5. The self-supporting composite according to claim 4 wherein the crystal content of said polycrystalline body component is substantially in the form of a monolayer and the thickness of said polycrystalline body component is substantially the thickness of the monolayer of crystals.

6. The self-supporting composite according to claim 4 wherein said polycrystalline diamond and/or cubic boron nitride body component is integrally bonded to a second polycrystalline diamond and/or cubic boron nitride body component, said polycrystalline body components differing from each other significantly in said content of said crystals.

7. The self-supporting composite according to claim 4 wherein said crystals are diamond.

8. The self-supporting composite according to claim 4 wherein said crystals are cubic boron nitride.

* * * * *